United States Patent [19]
Massicotte

[11] 3,897,946
[45] Aug. 5, 1975

[54] REACTION INDICATING DEVICE

[76] Inventor: Alfred G. Massicotte, 4752 Green Ave., Los Alamitos, Calif. 90720

[22] Filed: Dec. 11, 1973

[21] Appl. No.: 423,801

Related U.S. Application Data

[62] Division of Ser. No. 152,885, June 14, 1971, Pat. No. 3,784,197.

[52] U.S. Cl. .............................. 273/1 R; 35/22 R
[51] Int. Cl. ............................................. A61b 5/16
[58] Field of Search ................. 273/1 R, 1 E, 1 M; 35/22 R

[56] References Cited
UNITED STATES PATENTS

| | | | |
|---|---|---|---|
| 3,204,956 | 9/1965 | Ames | 273/1 R |
| 3,463,487 | 8/1969 | Tepper | 273/1 R |
| 3,503,608 | 3/1970 | Ylinen | 273/1 E |
| 3,578,320 | 5/1971 | Goldfarb et al. | 273/1 R |
| 3,655,191 | 4/1972 | Grant | 273/1 R X |
| 3,712,616 | 1/1973 | Goldfarb et al. | 273/1 R |

Primary Examiner—Paul E. Shapiro
Attorney, Agent, or Firm—Ronald L. Juniper

[57] ABSTRACT

A mechanical apparatus which includes a mobile indicator member supported by at least two changeable-position reaction members, anyone of which, when moved, can cause the indicator member to move to associate with it thereby indicating which one of the reaction members was first to undergo a change in position.

16 Claims, 11 Drawing Figures

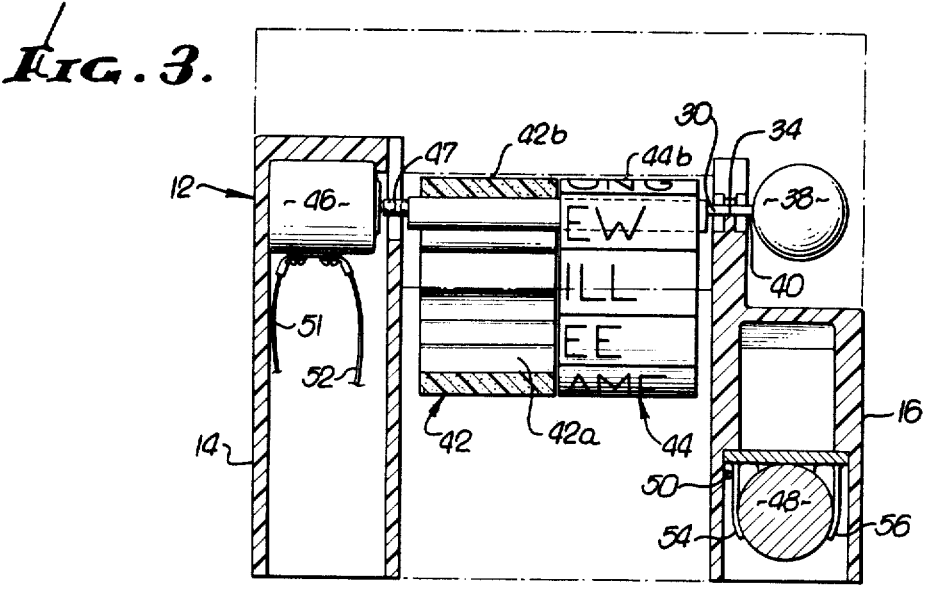
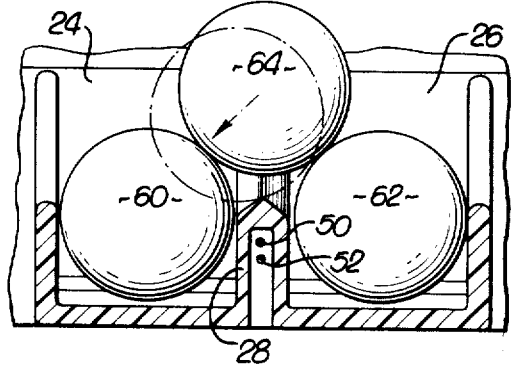
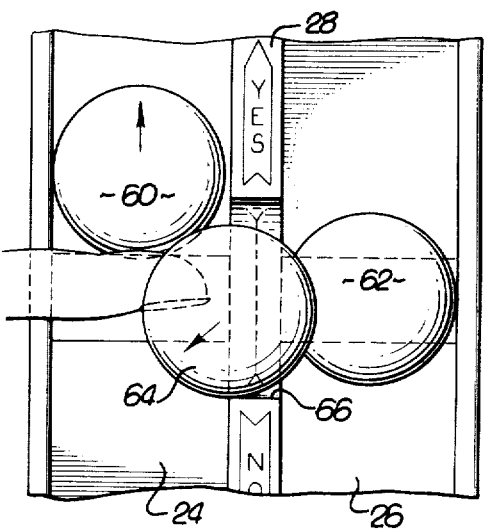
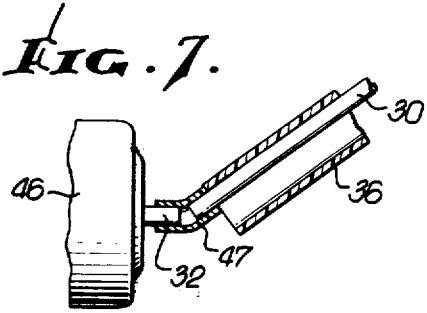

1

REACTION INDICATING DEVICE

This is a division of co-pending application Ser. No. 152,885 filed June 14, 1971 now U.S. Pat. No. 3,784,197.

BACKGROUND OF THE INVENTION

The scrambling of various indicia by rotating rings carrying the indicia has long been a popular basis for entertainment devices. However, prior to this invention the immediate alignment of indicia on adjacent rings has seldom been achieved without expensive and cumbersome mechanisms. Hence, precise, quick alignment of indicia which can form a basis for testing reaction time has not generally been feasible.

Further, devices that can economically, reliably, and accurately test reaction time which can be used with indicia scrambling devices have not been available. The result has been the absence of truly workable indicia scrambling devices which are combined with accurate reaction indicating devices that are economically feasible and reliable to use.

Hence, among the desirable objects attained by this invention are included simple and efficient means for successively displaying a changing variety of indicia without necessitating premeditation or forethought as to their order. The apparatus operates automatically throughout to repeatedly replace series of indicia varying in assortment and the variety included in each succeeding series is undeterminable, and consequently premeditation is not required to provide a continuously-changeable series.

Moreover, the device has utility for educational purposes as it affords means for displaying indicia in practically endless variety and reduces the labor of selecting and displaying numbers, colors, pictures, or the like to students in testing their knowledge or instructing them.

DESCRIPTION OF THE DRAWINGS

FIG. 3 is a horizontally sectioned view of the game as shown in FIG. 1 taken on the plane of lines 3—3 therein.

FIG. 5 is an enlarged detailed horizontally sectioned view taken through the plane of lines 5—5 in FIG. 1 showing the reaction and indicator balls.

FIG. 6 is a top plan view of the reaction and indicator balls similar to FIG. 5 but moved to a different position.

FIG. 7 is an enlarged, detailed, partially sectioned, view of the axle mounting to the drive shaft of the motor taken on line 7—7 in FIG. 4.

DESCRIPTION OF THE INVENTION

Figure 1:
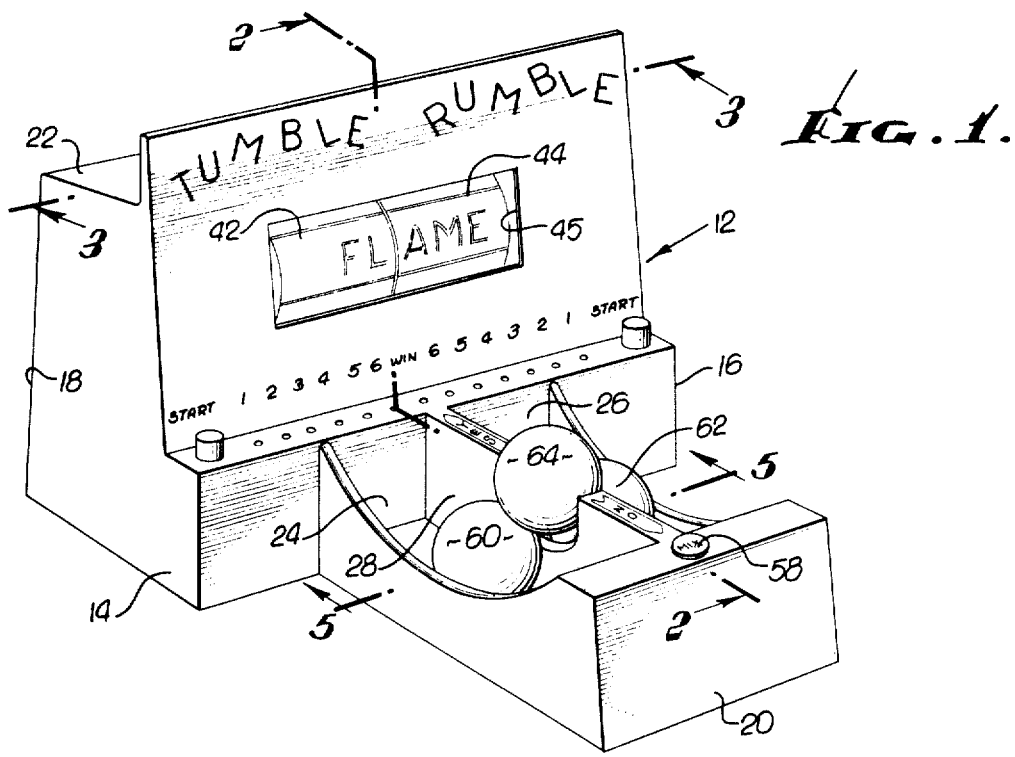
FIG. 1 is an isometric view of a device in accordance with invention showing a scrambled word part game.

Referring to the drawings, a preferred embodiment of this invention is illustrated which is enclosed in a hollow housing 12 formed with a generally flat base 13, spaced parallel side walls 14 and 16, and walls 18 and 20, and a top portion joining the upper edges of said walls 14, 16, 18, and 20 which includes an enlarged raised dome 22 forward of which are a pair of recessed pockets 24 and 26 separated by a raised divider segment 28.

Mounted for substantially horizontal rotation within dome 22 is an axle 30 supported by bearings 32 (an extension of the motor drive means) and 34 formed as a teflon-lined slot in housing 12. A peripheral tubular axle member 36 is attached offset on an internal side thereof to axle 30 so as to impart an eccentric arcuate motion thereto when the axle 30 is rotated. Other means for imparting eccentric motion to the axle, such as offsetting the axle on its means for rotation, if essentially consistent with the means for achieving the desired results, may be used in this invention.

In order to provide a quick release of the tumblers from the axle 30 it is pivotally mounted to the bearing support 32 and bearing support 34 is open at the top. A flywheel-type rotation continuance effect is created by attaching a weighted ball 38 on the free end 40 of axle 30. The weighted ball 38 also functions to prevent the free end 40 of axle 30 from jumping out of its open bearing support 34 during rapid axle rotation.

Hoop-shaped tumblers 42 and 44 are loosely carried by axle 30 so that a portion of each of their respective circumferential internal peripheral surfaces 42a and 44a bears against an adjacent portion of tubular axle member 36. Each of the internal peripheral surfaces 42a and 44a is formed with a series of inclined recessed portions separated alternately by a raised portion so as to produce a convoluted form and a general corrugated effect. The diameter of the tubular axle member 36 is smaller than a recessed portion between the separated raised portions which define each of its edges. In the form shown in the drawings, the curved shape of each of the recesses loosely fits the circular exterior shape of the tubular axle member 36. These corresponding relationships of size and shape help achieve the operative effect of this device describe herein later. Generally, the central axis of each tumbler is substantially parallel with the axle. Also the axle diameter is sufficiently small to frictionally engage the recessed portions of the tumblers.

On the circumferential exterior peripheral surfaces 42b and 44b of each of the tumblers 42 and 44 are a series of indicia, which, in this case, are parts of words. Each of these indicia correspond to one of the recessed portions in the internal peripheral surfaces 42a and 44a, respectively, and is adjacent thereto. Hence, when the tumblers 42 and 44 are resting on axle member 36 in one of their recessed portions, the corresponding respective indicia are aligned between the tumblers 42 and 44. Moreover, after the tumblers have been rotated and they are coming to rest, they are urged to become aligned in their respective recesses by their inclined shape.

Figure 2:
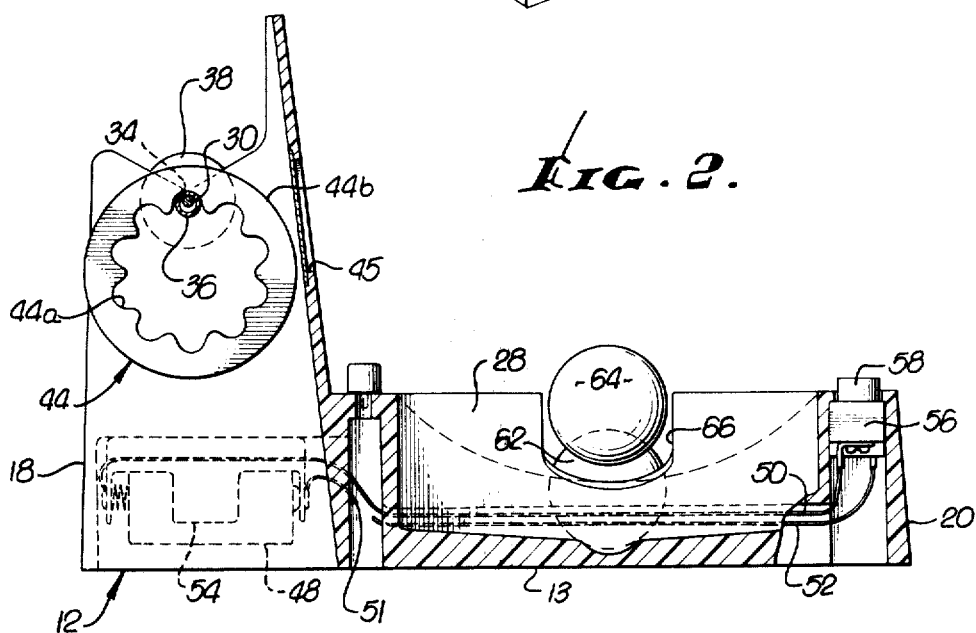
FIG. 2 is a longitudinally sectioned view of the game as shown in FIG. 1 taken on the plane of lines 2—2.

Means to rotate axle 30 and impart eccentric rotational motion through axle member 36 to cause tumblers 42 and 44 to rotate is provided by a motor 46 mounted in housing 12. The rotary driving means of motor 46 is attached to axle 30 through the extended motor bearing 32 and flexible coupling 47 to provide said rotation. In the form illustrated, the motor 46 is of the electric direct current type and is powered by a dry cell battery 48 which is mounted in housing 12 in easy release holding spring arms 54 and 56 as shown in FIG. 3. Included within the electrical circuitry is a normally-off circuit breaker switch 56 which is mounted in a forward section of housing 10 as shown in FIG. 2 and is operated by a spring-returned pushbutton 58 which protrudes through a mating opening in the housing. In this arrangement the motor 46, dry cell 48, and switch 56 each have 2 electrical terminals. One terminal of the dry cell 48 is electrically connected to one terminal of the switch 56 through wire 50. The other terminal of the dry cell 48 is electrically connected to one terminal of the motor 46 through wire 51. A third wire 52 completes the configuration by electrically connecting the remaining terminal of the motor 46 to the remaining terminal of the switch 56.

Scrambling of the indicia is commenced by depressing pushbutton 58 to close the circuit through dry cell battery 48 and motor 46, energizing motor 46 to cause the attached axle 30 to begin rotational movement. The eccentrically attached axle member 36 then begins eccentric rotational movement thereby causing an upward thrust force to be exerted upon the internal surfaces 42a and 44a through half of each complete rotation of axle 30. This thrusts the respective tumblers 42 and 44 into an essentially upward trajectory which, when the rotational speed of axle member 36 is sufficient, causes the tumblers to lift out of the respective particular recesses within which they are resting so that the tumblers will free-float. In this state occasional contact of a bouncing nature will occur between the axle member 36 and internal surfaces 42a and 44a thus imparting kinetic energy (of rapidly varying magnitude and direction) to the respective tumblers thereby causing each tumbler individually to undergo random motion consisting of rapidly varying rotational, vertical, and horizontal components of movement. The tumblers are preferably made of foam plastic or other light material.

Hence, since the tumblers will not bounce on the axle member 36 in exactly the same manner, the relative amount of rotation of the tumblers to each other will vary. When the rotation is stopped, they will rest in different recessed portions of internal peripheral surfaces 42a and 44a so that correspondingly different indicia will be aligned on external peripheral surfaces 42b and 44b which can be viewed through an opening 45 in the forward wall of dome 22. That is, rotation of axle 30 at predetermined speeds will cause random scramble motion in the tumblers carried thereon so that when they come to rest when rotation is stopped, the indicia carried on the tumblers are, also, randomly scrambled relative to each other.

An analysis of the characteristics of the tumblers and axle member upon which they are carried so as to achieve the desired result of reliable alignment of the tumblers relative to each other after rotation when the axle stops indicates that the dynamics of the gravitational force and frictional movement are specially developed by the structure of this invention. That is, the hollow core tumblers' internal peripheral surfaces are convoluted so that a continuous series of slopes are formed which are steep enough that as the rate of axle rotation diminishes below a preselected point each tumbler will slide down into a chance-selected recess between converging slopes of the tumbler to seat the tumbler on the axle member 36. Thus, each tumbler, through its own weight, is forced to come to rest in one of various predetermined orientations thereby providing a quick alignment of the tumblers relative to each other so that a positive indicia read-out can be made.

An important function of the weighted ball 38 is to reduce the gradient of deceleration of the rotational speed of the axle in order to insure that ample time will be provided for the tumblers to experience the aligning effects of a relatively slow rotating axle member 36 before the axle member comes to rest. Thus, were the gradient of deceleration of the rotational speed of the axle sufficiently steep, the axle could then at least occasionally come to a complete stop before the tumbler comes out of the free-floating state thereby permitting the tumbler to land upon the non-rotating axle member 36. If when the tumbler lands upon the non-rotating axle member 36 the particular contact between the tumbler and the axle member is of such a nature as to prevent the tumbler from seating one of its recesses to the axle member, it will probably not be possible to make a positive indicia read-out.

On the other hand, the flywheel-type rotation continuance effect created by the weighted ball 38 will cause the gradient of deceleration of the rotational speed of the axle to be sufficiently mild such that after the motor is de-energized, the axle member 36 will continue for a while to force the free-floating scrambling condition of the tumblers. When the axle member slows to a point that is insufficient to sustain the tumblers in a free-floating condition, the tumblers will land upon the rotating axle member. If the tumbler lands on the axle member in such a manner as to tend to resist the seating of the tumbler to the axle member which is an unfavorable position, rotation of the axle member will supplement the alignment efforts of said continuous series of slopes by rolling the tumbler out of the unfavorable position and into a recess. The axle member will then continue to rotate very slowly for a short while as the last of the axle's rotational energy is dissipated. Even though the axle member 36 will continue to rotate for a short duration following the alignment of the tumblers, the slowly rotating axle member 36 will not roll the tumblers out of the aligned status because of the steepness of said slopes in combination with an adequately low coefficient of friction between the axle member 36 and the interior peripheral surfaces of the tumblers.

A reaction indicator device used in this invention includes a changeable-position first reaction ball 60 carried in pocket 24, a changeable-position second reaction ball 62 carried in pocket 26 and a mobile indicator ball 64 mounted in a loosely conforming slot 66 formed in the divider segment 28 which acts as a barrier means separating the pockets 24 and 26. Each of the floors of pockets 24 and 26 slope downwardly from both ends on a plane perpendicular to divider segment 28 toward central grooves which are disposed on opposite sides of slot 66 on a line perpendicular to divider segment 28. Hence, normally as shown in FIGS. 1 and 5, indicator ball 64 will be supported in slot 66 by reaction balls 60 and 62 on each side since the force of gravity will urge balls 60 and 62 to roll into a resting position in the central grooves which serve as retention means and are the respective lowest positions in pockets 24 and 26.

Support is removed from the indicator ball 64 when the position of at least one of the reaction balls 60 or 62 is sufficiently changed to achieve this result. That is, if either one of the reaction balls 60 or 62 is moved forward or backward in its respective pocket, indicator ball 64 will lose its suppport on that side because of the directing means of this structure and reaction balls and drop out of the slot 66 and into the pocket corresponding to that reaction ball which was first to be moved. In order to eliminate the possibility that the indicator ball 64 will occasionally come to rest on the floor of the slot 66 and to insure that the indicator ball 64 will invariably fall into a pocket, slot 66 has a floor that is formed by two inclined planes that slope downwardly from a plane that is parallel to and midway between the faces of the divider segment. The reaction balls 60 and 62 are substantially equal in size so as to provide balanced reaction time. Also, preferably, indicator ball 64 is substantially equal in size with the reaction balls. Players of this game can deflect and move their respective reaction ball by pushing it with a finger in the form shown. Other deflection means (not shown) could be to use mechanical, electrical, etc. means to deflect the reaction balls.

In order to use this device as a game adapted for two persons to play, the objective is to determine which player first recognizes and evaluates relative information on the indicia of the tumblers 42 and 44 as they come to rest after scrambled rotation is caused by pushing and releasing button 58. As an indicator of the first player to react, each player will have one of the reaction balls 60 or 62 to move when he knows the answer to the problem on the tumblers. The first player to move his reaction ball will cause the indicator ball 64 to drop into his pocket as illustrated by the movement in FIG. 6. To determine whether the answer is correct to a yes-no type question, the front part of each pocket is designated "no" and the rear part is designated "yes". Thus, the reaction ball is moved into the part of the pocket which is thought to represent the correct answer. A suggested scoring is 1 point for a player's correct reaction and a 2 point penalty for a player's incorrect reaction. The pegs with marked holes for each player as shown in FIG. 1 represent a convenient manner for keeping score.

Figure 4:
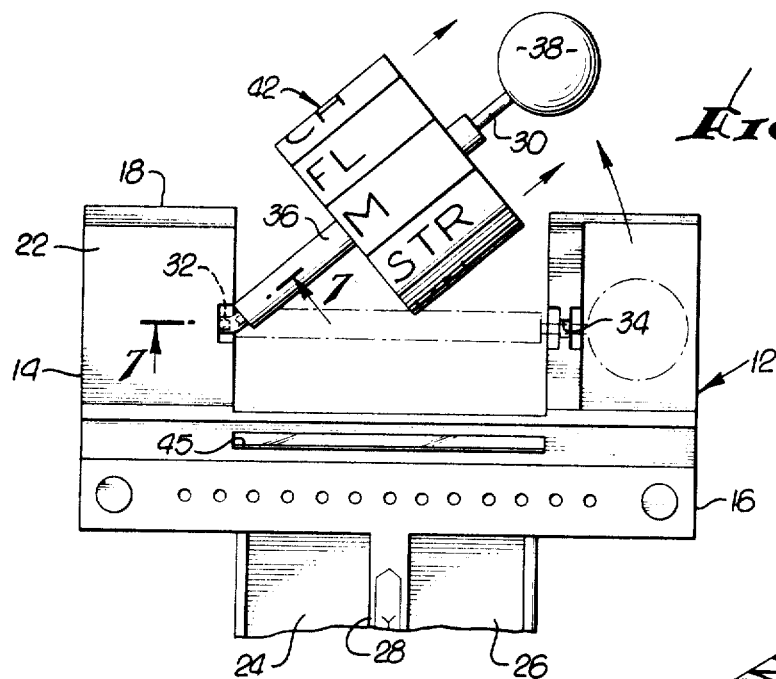
FIG. 4 is a fragmented top plane view showing the axle lifted out of position to interchange the tumblers.
Figure 8:
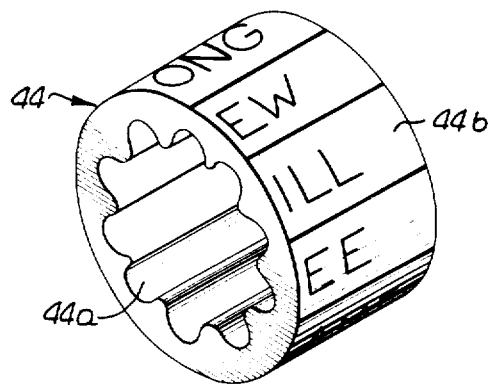
FIG. 8 is an isometric view of a typical tumbler used with this device similar to that shown in the previous Figures.
Figure 9:
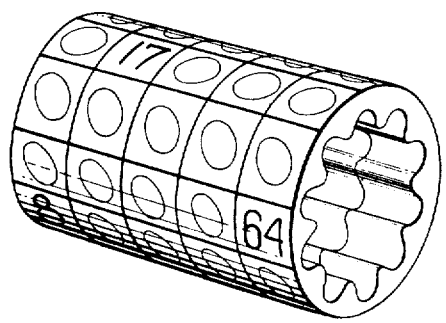
FIG. 9 is an isometric view of a modified set of tumblers which is illustrative of what can be interchanged and used to play bingo.

In order to interchange tumblers to provide different indicia, the axle 30 can be pivoted out and the tumblers quickly changed as shown in FIG. 4. More than two tumblers can be used, depending on the requirements of the game problem, as illustrated by the five tumblers shown in FIG. 9.

Figure 10:
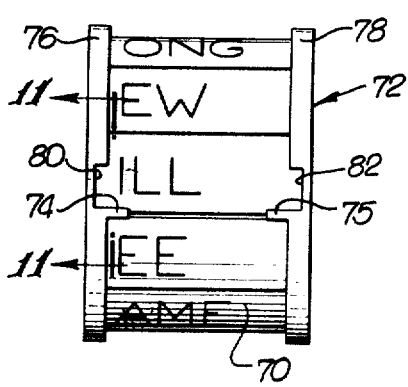
FIG. 10 is a front elevational view of another modification of the tumbler usable with this device which includes an interchangeable indicia strip.
Figure 11:
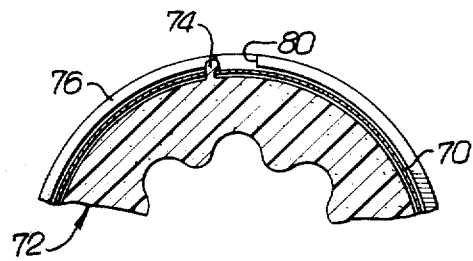
FIG. 11 is a fragmented cross-sectional view taken through 11—11 in FIG. 10 showing the detailed attachment means for the interchangeable indicia strip.

In addition, a tumbler can be made so that the indicia are contained on a strip which can be made of paper, plastic, or other flexible material which can be attached to the exterior peripheral surface of the tumbler as shown in FIG. 10 and 11. In this form the strip of paper 70 is substantially the length of the circumference of the tumbler 72 to which it is to be attached. The tumbler 72 is provided near each side edge with small protruding aligned transverse stops 74 and 75 which have slightly enlarged outer ends and inwardly sloping faces nearest the outer circumferential peripheral surface of the tumbler to form transverse grooves on one side of the stops. Extending circumferentially on both edges around the tumbler 72 are inwardly turned lips 76 and 78 which provide a groove on each edge around the tumbler opening only adjacent to the transverse stops 74 and 75. Thus, the strips of various indicia can be easily interchanged and held in place on the side edges by the grooves formed under the lips 76 and 78 and the first-to-enter edge held in place by the grooves formed under lips 76 and 78 and the last-to-enter edge held in place by sliding under the transverse grooves formed by stoops 74 and 75. The size of indicia strip 70 is closely conformed to the dimensions of the outer peripheral surface of tumbler 72 so that it will be held in place by the grooves thereon. It is interchanged by sliding one end through openings 80 and 82 in the respective lips 76 and 78 until removed or snapped completely in place. The function of the transverse grooves formed in stops 74 and 75 is to provide a holding means for the last-to-enter edge of strip 70 which can be a single transverse groove or plurality of grooves.

As examples of several games which may be played with this device, the following is intended to show how it may be used with illustrative instructions for the games:

PREPARATION

There are many Tumble Rumble programs, covering subjects of every sort. However, no matter what program is on, the playing rules stay the same. In this high-speed game of reflex two players are matched against one another, each trying to be the first to score 7 points for a WIN. Included with each program is the program question. The question can always be answered with simply yes or no. Choose the program you want to play and loop these tumblers over the Tumble Rumble shaft. The two players sit in front of Tumble Rumble, one to the left and one to the right. Read the program question and make sure you have it well in mind. This same question is used throughout the entire game. it is used anytime that this program is on.

MIXING

The player at the left begins the game by pressing the "MIX" button, causing the elctric motor to turn the Tumble Rumble shaft and bat the tumblers into chance motion. The player then releases the button. This causes the Tumble Rumble shaft to come to a stop and to make the tumblers line up. Pay attention only to what you see in the window between the bars. Except for the first mix of the game, the MIX button is to be operated by the player who did not score on the previous mix.

CLAIMING

Each of the two players must try to decide as fast as possible whether the answer to the question is yes or no. He must then immediately claim this stand by flicking his ball (the red ball that rests in his claim alley) in the direction of the "YES " arrow, if his answer is yes, or in the direction of the "NO" arrow, if his answer is no.

SCORING

In Tumble Rumble you are rewarded for observing quickly and accurately, for analyzing quickly and accurately, and for acting quickly and accurately. Basically, the game will be won by the person who is better at getting the right answer fast. For each mix both players have the opportunity to score; however, only one of the players will score. One point is earned for being first to claim an answer, by capturing the black ball; however, if the opponent can prove that the answer was wrong, no point is allowed for being first and the opponent gets two points for carefulness. A proof list is provided with every program in which one is practical. Either player may look at the proof list at any time during the game, even when trying to decide which answer to claim.

PROGRAM 101

Question

In the real world is the thing pictured on the left larger than the think pictured on the right?

Proof List

Here are the names of all 20 things that are seen in this program. The first thing on the list is the smallest. The second thing is larger than the first, but smaller than all the other things. The farther we look down the list the larger are the things. The last thing on the list is the largest of all.

ladybug
housefly
ring
key
pocket watch
pear
drinking glass
football
loaf of bread
rabbit
chair
horse
car
bus
house
church
stadium
mountain
moon
Sun

PROGRAM 102

Question

Is this group of letters a word?

Special Instructions

Any group of general usage in the United States are "words" for the purpose of this game except those capitalized, abbreviations, and words requiring apostrophes or hyphens.

Proof List

Here are all of the words that can appear in the window. To make them easy to find they are listed in alphabetical order. So that you might become more familiar with these words one meaning is given to you with each of the words. For most of the words the pronunciation is obvious. With two of these words, however, the correct pronunciation is shown in parentheses to give help, if necessary.

chew: to crush with the teeth.
chick: a young chicken.
chill: a bodily coldness.
chip: a small piece of wood broken off.
chough: (chuf) any of several crowlike, Old World birds.
drew: past of "draw."
drill: a tool for making holes.
drip: to fall in drops.
flame: the burning gas of fire, appearing as a tongue of light.
flee: to go swiftly, as from danger.
flew: past of "fly."
flick: to strike with a light, quick stroke.
flip: to toss with a quick jerk.
flong: material used for making printing molds.
flower: blossom.
knee: the joint between the thigh and the lower leg.
knew: past of "know."
knower: one who knows.
lame: crippled.
land: the solid part of the earth's surface.
lee: shelter.
lick: to pass the tongue over.
lip: either of the two fleshy folds forming the edges of the mouth.
long: measuring much in space or time.
lower: to let down.
mew: (mu) a cage, as for hawks.
mill: a building with machinery for grinding grain into flour.
mower: a machine for cutting grass.
rand: in shoemaking, a strip of leather set in a shoe at the heel before the lifts are attached.
rick: a stack of hay.
rill: a little brook.
rip: to tear apart roughly.
rough: uneven.
rower: one who propels a boat by using oars.
shame: dishonor.
shill: One who poses as a customer in order to attract others into participating in a gambling game.
ship: any large vessel navigating deep water.
shower: a brief fall of rain.
strand: any of the threads that are twisted together to form a string.
strew: to scatter.
strick: any of the pieces cut from a layer of carded and combed silk.
strip: a long, narrow piece.
strong: physically powerful.
three: one more than two.
threw: past of "throw."
thrill: to cause emotional excitement.
throng: a crowd.
through: in one side and out the other side of.
thrower: one who sends something through the air by a rapid motion of the arm.

PROGRAM 103

Question

Is this a BINGO?

Explanation

A BINGO occurs when all of the numbers in one straight line are covered with BINGO chips. Therefore, if one or more numbers are still uncovered, you do not have a BINGO.

Though certain preferred forms of this invention have been described and illustrated herein, this invention is not intended to be limited strictly thereto, but is to comprehend the scope of the following enclosed claims.

I claim:

1. An indicating apparatus comprising: A supporting structure; at least two changeable position reaction members carried by said supporting structure; one mobile indicator member supported at least in part by said reaction members; a barrier means separating at least in part each of said reaction members from the rest of said reaction members; a directing means to force said indicator member to associate with one of said reaction members when the position of at least one of said reaction members is sufficiently changed to remove support from said indicator member; a retention means to confine said reaction members to separate home positions where support is provided for said indicator member until one of said reaction members is forced to change positions so as to cause said indicator member to move, at least in part, to that side of said barrier means corresponding to the particular reaction member that underwent change in position thereby indicating which one of said reaction members was first to undergo a change in position.

2. An indicating apparatus as defined in claim 1 wherein a balancing means is included to confine said indicator member such that it will receive substantially all of its support from said reaction members.

3. An indicating apparatus as defined in claim 1 wherein said reaction members are provided with automatic return means to return them to their said separate home positions.

4. An indicating apparatus as defined in claim 1 wherein said reaction members are deflectable supporting members.

5. An indicating apparatus as defined in claim 1 wherein a balancing means is included to confine said indicator member such that it will receive substantially all of its support from said reaction members, and each of said reaction members is a deflectable supporting member.

6. An indicating apparatus as defined in claim 1 wherein a balancing means is included to confine said indicator member such that it will receive substantially all of its support from said reaction members, there is a total of two of said reaction members, and each of said reaction members is a deflectable supporting member.

7. An indicating apparatus as defined in claim 1 wherein a balancing means is included to confine said indicator member such that it will receive substantially all of its support from said reaction members, and each of said reaction members is a substantially-spherical deflectable supporting member.

8. An indicating apparatus as defined in claim 1 wherein a balancing means is included to confine said indicator member such that it will receive substantially all of its support from said reaction members, each of said reaction members is a substantially-spherical supporting member, and said indicator member is substantially spherical.

9. An indicating apparatus as defined in claim 1 wherein a balancing means is included to confine said indicator member such that it will receive substantially all of its support from said reaction members, there is a total of two of said reaction members, each of said reaction members is a substantially-spherical supporting member, said indicator member is substantially spherical, and said barrier means is formed as a dividing wall of said supporting structure.

10. An indicating apparatus as defined in claim 1 wherein a balancing means is included to confine said indicator member such that it will receive substantially all of its support from said reaction members, there is a total of two of said reaction members, each of said reaction members is a substantially-spherical, supporting member, said indicator member is substantially spherical, said barrier means is formed as a dividing wall of said supporting structure, and said dividing wall possesses a slot in which said indicator member loosely rests without touching the slot floor of said slot.

11. An indicating apparatus as defined in claim 1 wherein a balancing means is included to confine said indicator member such that it will receive substantially all of its support from said reaction members, there is a total of two of said reaction members, each of said reaction members is a substantially-spherical supporting member, said indicator member is substantially spherical, said barrier means is formed as a dividing wall of said supporting structure, said dividing wall possesses a slot in which said indicator member loosely rests without touching the slot floor of said slot, and said balancing means is formed as slot walls of said slot.

12. An indicating apparatus as defined in claim 1 wherein a balancing means is included to confine said indicator member such that it will receive substantially all of its support from said reaction members; there is a total of two of said reaction members; each of said reaction members is a substantially-spherical supporting member; said indicator member is substantially spherical; said barrier means is formed as a dividing wall of said supporting structure; said dividing wall possesses a slot in which said indicator member loosely rests without touching the slot floor of said slot; said balancing means if formed as slot walls of said slot; and said directing means is formed as the combined surfaces or said spherical supporting members, said slot floor, and said dividing wall.

13. An indicating apparatus as defined in claim 1 wherein a balancing means is included to confine said indicator member such that it will receive substantially all of its support from said reaction members; there is a total of two of said reaction members; each of said reaction members is a substantially-spherical supporting member; said indicator member is substantially spherical; said barrier means is formed as a dividing wall of said supporting structure; said dividing wall possesses a slot in which said indicator member loosely rests without touching the slot floor of said slot; said balancing means if formed as slot walls of said slot; said directing means is formed as the combined surfaces of said spherical supporting members, said slot floor, and said dividing wall; and said slot floor is formed as two floor surfaces that slope downwardly from a line that is parallel to the two faces of said dividing wall and midway between said faces.

14. An indicating apparatus as defined in claim 1 wherein a balancing means is included to confine said indicator member such that it will receive substantially all of its support from said reaction members, each of said reaction members is a substantially-spherical deflectable supporting member, and said retention means is formed as central grooves which are disposed on opposite sides of said barrier means on a line perpendicular to said barrier means.

15. An indicating apparatus as defined in claim 1 wherein said reaction members are substantially-spherical supporting members and means is included to automatically return said supporting members to their separate home positions.

16. An indicating apparatus as defined in claim 1 wherein said reaction members are substantially-spherical supporting members and said supporting members are automatically returned to their separate said home positions by a floor means in which each of a plurality of floors slope downwardly on a line parallel to said barrier means and ending at one of said home positions.

* * * * *